United States Patent [19]

Negrotti

[11] Patent Number: 5,640,074

[45] Date of Patent: Jun. 17, 1997

[54] VIBRATION DAMPENING METHOD AND APPARATUS FOR BAND DRIVEN PRECISION MOTION SYSTEMS

[75] Inventor: Jerry F. Negrotti, Beverly, Mass.

[73] Assignee: Agfa Division, Bayer Corporation, Wilmington, Mass.

[21] Appl. No.: 901,382

[22] Filed: Jun. 19, 1992

[51] Int. Cl.⁶ .................................................. G05B 5/01
[52] U.S. Cl. .................. 318/611; 318/620; 318/6; 318/11
[58] Field of Search ........................ 318/560–646, 318/1–16, 663, 687; 83/13, 56, 76.007, 859, 499, 508.3; 364/474.011, 474.028; 400/53, 320, 322; 474/111, 138, 133, 135, 101, 117, 136, 134; 73/505, 492, 151; 355/3 DD, 14 SH; 200/47; 118/658; 51/241 S; 164/263

[56] References Cited

U.S. PATENT DOCUMENTS

| | | | |
|---|---|---|---|
| 3,675,751 | 7/1972 | Fortner | 200/47 X |
| 4,318,625 | 3/1982 | Survant | 400/322 |
| 4,398,496 | 8/1983 | Kopko | 118/658 |
| 4,417,802 | 11/1983 | Forbes, II | 355/3 DD |
| 4,499,851 | 2/1985 | Kopko et al. | 118/658 |
| 4,576,041 | 3/1986 | Martin | 73/151 |
| 4,589,651 | 5/1986 | Silverberg | 355/14 SH |
| 4,589,652 | 5/1986 | Silverberg | 355/14 SH |
| 4,618,138 | 10/1986 | Silverberg | 355/14 SH |
| 4,636,700 | 1/1987 | Moore et al. | 318/611 |
| 4,723,144 | 2/1988 | Silverberg | 355/3 DD |
| 4,945,293 | 7/1990 | Wittkopf et al. | 318/7 |
| 4,993,993 | 2/1991 | Gill | 474/111 |
| 5,073,148 | 12/1991 | Dec | 474/94 |
| 5,098,209 | 3/1992 | Gomoll et al. | 400/320 |
| 5,137,075 | 8/1992 | Gerding | 164/263 |
| 5,165,206 | 11/1992 | Sword et al. | 51/241 S |
| 5,207,308 | 5/1993 | Sheffield et al. | 198/336 |

*Primary Examiner*—Paul Ip
*Attorney, Agent, or Firm*—Julie A. Krolikowski; John A. Merecki

[57] ABSTRACT

A method and apparatus are disclosed for joining a drive band to the driven element of a servo-controlled precision motion system. A vibration dampening clamp assembly absorbs unwanted vibration energy. The clamp assembly utilizes energy absorbing molded grommets which mechanically isolate the driven element from the band. A threaded fastener passing through an axial bore in each of two energy absorbing grommets is used to join two halves of a clamp assembly. The grommets are preloaded at assembly using threaded fastener and a nut to compress each grommet to a known compression prior to tensioning of the drive band. Upon final tensioning of the band drive assembly, the grommets are brought to a final compression value.

12 Claims, 3 Drawing Sheets

VIBRATION DAMPENING METHOD AND APPARATUS FOR BAND DRIVEN PRECISION MOTION SYSTEMS

BACKGROUND OF THE INVENTION

The present invention relates to high tension friction driven servo controlled linear motion systems, sometimes referred to as capstan drives, and more particularly to a method and apparatus for joining a metal drive band to the driven element using energy absorbing materials to absorb band vibration energy. Precision linear motion systems using servo controlled position or velocity loops, or both, provide linear motion in either a continuous or start-stop manner. The velocity and position of the driven element can be critical for only one direction of travel, in which case the driven element can be slewed back to a start position before the next motion, or the velocity and position of the driven element can be critical for both directions of travel.

A band drive system, without feedback to the control loop of driven element position, presents many problems because the band must never slip relative to the drive pulley nor can any stretching or vibration of the band be allowed which would cause motion disturbances to be transmitted to the driven element. In such an open loop system, where the input drive angular position, as determined by the drive's rotary encoder, is the only feedback of the linear position of the driven element, the designer must ensure that the drive torque is directly transmitted through the drive pulley to the band, and from the band to the driven element, without inducing errors in linear position and or velocity of the driven element.

Various methods of band mounting have been employed including rigid mounts in which no attempt is made to dampen unwanted motion in the band. For rigid mounting, problems occur when servo induced torque ripples at or near a resonant frequency of the band cause micro displacements of the band to be transferred to the driven element. These band vibration modes may be axial or transaxial, each causing different motion disturbance profiles to be transmitted to the driven element. The band vibration modes ultimately cause position or velocity errors at the driven element which are undetected by the servo motion control loop. Vibration energy from sources other than the servo drive system cause also cause the band to vibrate at its own natural frequency with the same result.

A prior art method for damping vibration energy in band drive systems is to wrap or coat the drive pulley with an energy absorbing layer. This method of wrapping the drive pulley is not acceptable in high pressure drive systems because with a compliant material wrapped around the pulley, the mean radius of the pulley becomes a function of band tension and absolute position and velocity errors of the driven element occur when the drive pulley radius varies.

It is accordingly, a general object of the present invention to provide a drive band-to-driven element joining method and apparatus that dampens unwanted energy in the band such that absolute position of the driven element is not a function of band tension.

It is another object of the invention to provide for energy absorption while still allowing the band to be maintained at a constant and high enough tension to prevent slippage between the band and the drive pulley.

It is a still another object of the invention to provide band vibration absorption over a wide enough range of vibration frequency to absorb the many band natural vibration frequencies associated with the changing length of unsupported band as the driven element moves from end to end of its travel.

It is a feature of the invention that the energy damping can be achieved through pre-compressed elements.

It is another feature of the invention that the final compression of the pre-compressed elements is accomplished by tensioning the drive band to its operating tension.

SUMMARY OF THE INVENTION

The present invention utilizes a set of pre-compressed energy absorbing grommets, one installed in each half of a two piece clamp, to absorb vibration energy of a metal drive band that is used to move and position a driven element in a servo controlled precision motion system. The two piece clamp joins the band to the driven element. A spacer mounted between the two clamp halves is employed to uniformly set the compression forces on the two grommets at assembly. After tensioning of the band, a final compression value of the grommets is achieved.

BRIEF DESCRIPTION OF THE DRAWINGS

The objects and features set forth above and other objects and features of the invention will best be understood from a detailed description of a preferred embodiment thereof, selected for purposes of illustration and shown in the accompanying drawings in which.

DETAILED DESCRIPTION OF THE INVENTION

Figure 1:
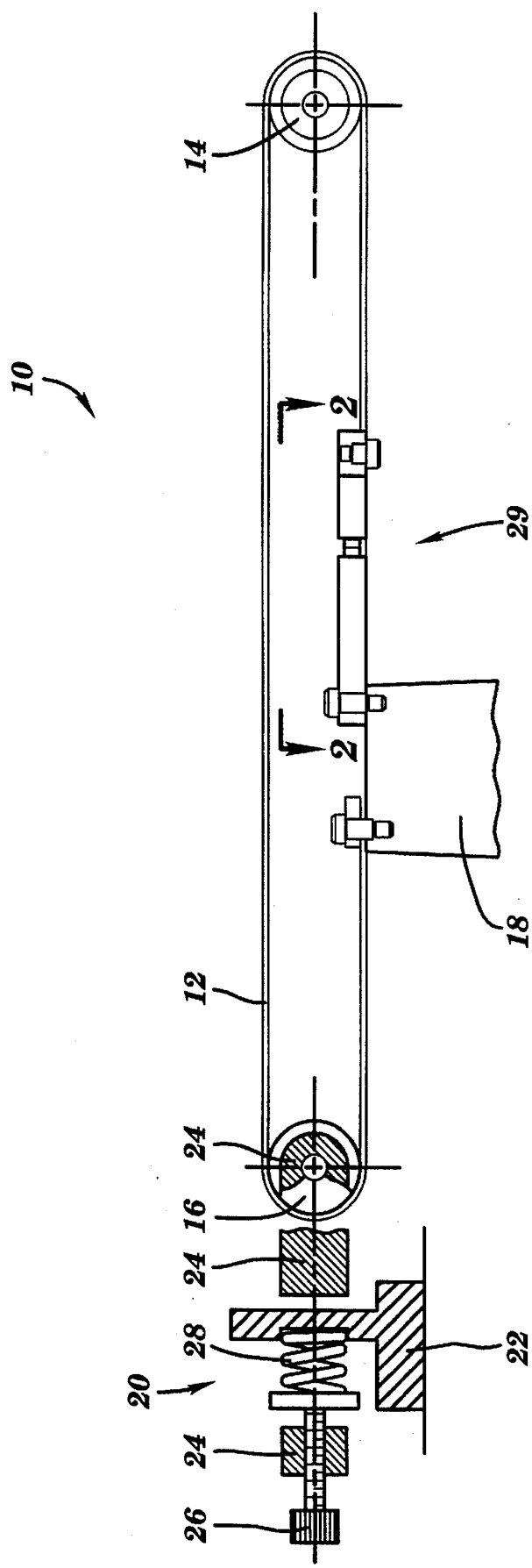
FIG. 1 is a view in partial section of a servo controlled band drive system showing the drive pulley, the idler pulley and band tensioning apparatus, the band, the band attachment points to the driven element and the vibration dampening clamp apparatus.

Turning now to the drawings, FIG. 1 depicts a servo driven band drive system indicated generally by the reference number 10. The drive system 10 comprises a band 12, a drive pulley 14, an idler pulley 16 and a driven element 18. The band tension is set and maintained by a band tensioning assembly 20 which comprises an idler base 22, an idler base clamp 24, a tension adjusting screw 26 and a compression spring 28. A vibration damping clamp apparatus is indicated generally by the reference numeral 29 and is shown in greater detail in FIGS. 2 and 3.

Figure 2:
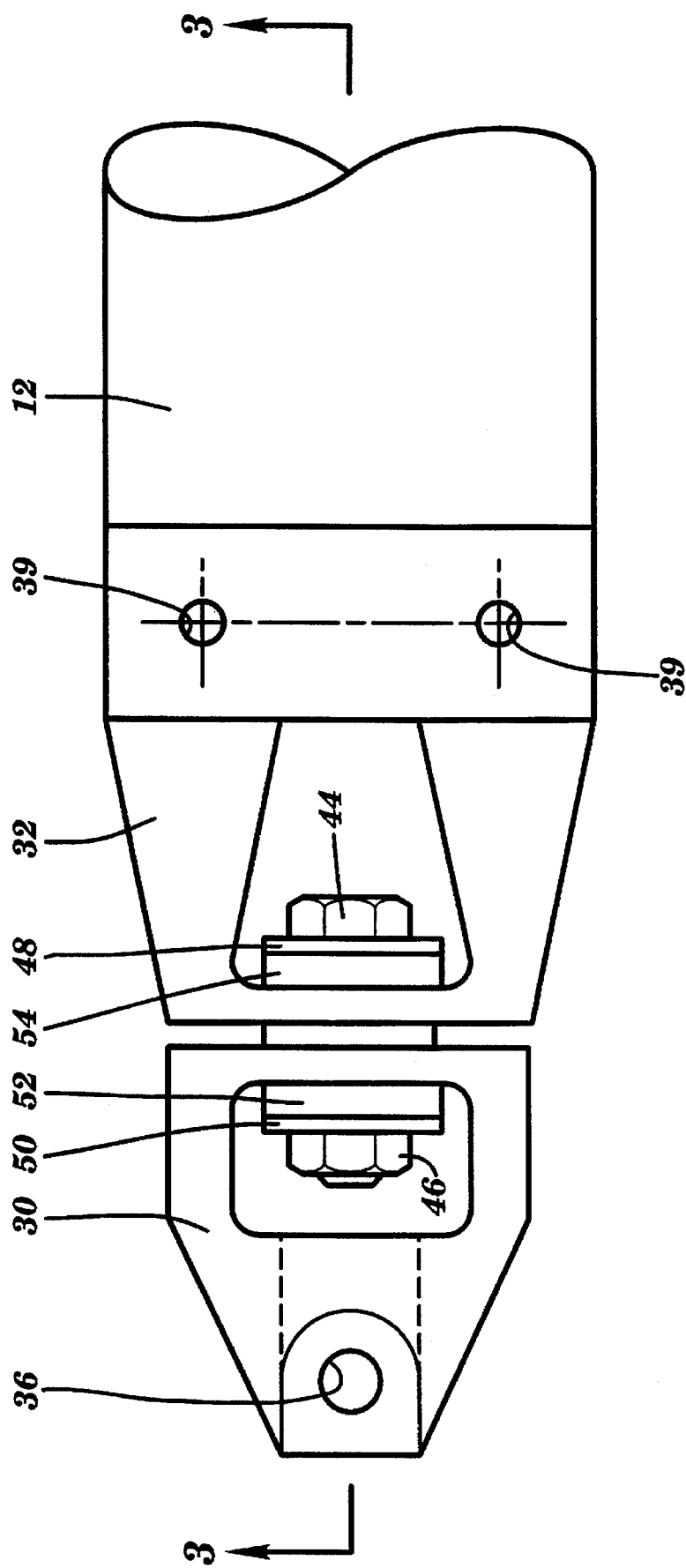
FIG. 2 is a plan view of the vibration dampening clamp apparatus taken along line 2—2 in FIG. 1, showing the two clamp halves joined by a threaded fastener and nut.
Figure 3:
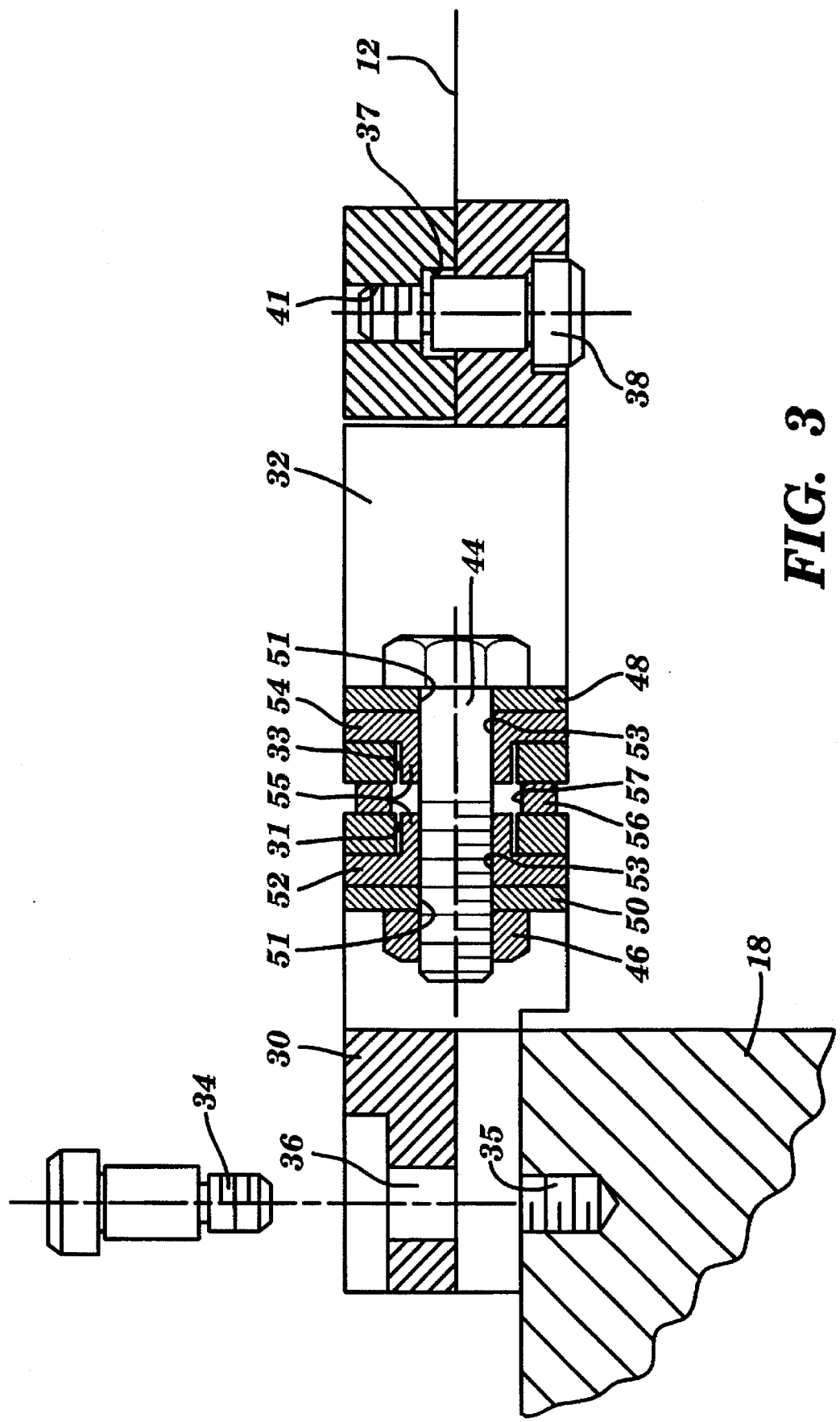
FIG. 3 is a view in partial section taken along line 3—3 of FIG. 2 showing the clamp apparatus rigid attachments to the band and driven element, the vibration absorbing grommets, washers and spacer joining the two clamp halves and, in addition, an attaching fastener and a portion of the driven element.

Referring now to FIGS. 2 and 3, a keel clamp 30 is rigidly mounted to the driven element 18 by means of a shoulder screw 34 that fits into a threaded bore 35 on the driven element. The shoulder screw 34 passes through a clearance hole 36 in the keel clamp 30 engaging the threaded bore 35 of the driven element 18. When tensioning the band, shoulder screw 34 is loose, but still engaged, providing an angular degree of freedom for the band 12 and band clamp 32 to self-align during apparatus. Only when the band and band clamp are at maximum tension, the band and band clamp having self-aligned, is the shoulder screw 34 tightened thereby providing a rigid mount of the keel clamp 30 to the driven element 18.

The band 12 mounts rigidly to the band clamp 32 with two shoulder screws 38 and an upper band clamp 40. The two shoulder screws 38 each pass through clearance holes 39 in band clamp 32, as well as clearance holes 39 in the band 12. The shoulder screws engage two threaded bores 41 in the upper band clamp 40. As the shoulder screws 38 are tightened, the upper band clamp 40 is drawn against the band 12 securing the band rigidly to the band clamp 32.

The two halves of the vibration dampening clamp apparatus are joined together by a threaded fastener 44 and nut 46 shown in partial section in FIG. 3. The threaded fastener 44 passes through an axial bore 33 in the band clamp 32 and an axial bore 31 in the keel clamp 30. Two nylon washers 48 and 50 are seated, respectively, against the head of threaded fastener 44 and against the nut 46. Each washer has a single axial hole 51 through which the threaded fastener 44 passes. The washers protect vibration dampening grommets, 52 and 54, from being damaged while rotating either the threaded fastener 44 or nut 46. In addition, the washers uniformly compress the two energy absorbing grommets 52 and 54.

The identical vibration dampening grommets, 52 mounted in band clamp 32, and grommet 54, mounted in the keel clamp 30, serve the purpose of mechanically isolating the band clamp 32 from the keel clamp 30 thereby effectively isolating the driven element 18 from the band 12. The circular cross sectioned grommets 52 and 54 each have an axial hole 53 through which the threaded fastener 44 passes and an annular shoulder portion 55 of smaller diameter than the grommet maximum cross section. The shoulder portion of grommet 52 fits snugly into the axial bore of the band clamp 32 while the shoulder portion of grommet 54 fits snugly into the axial bore of the keel clamp 30. The shoulder portion of the grommets serve to align the grommets and the two clamp halves axially.

The major cross section of the grommet provides mechanical isolation as well as transfers forces from each clamp half to the threaded fastener 44 and nut 46. A spacer 56 separates the keel clamp 30 from the band clamp 32 and provides a contact area between the two clamp halves to allow uniform transfer of the clamp forces to the grommets. The spacer 56 also serves to set the mechanical distance from the band mounting holes 37 to the driven element mounting hole 36. The spacer has an axial hole 57 through which threaded fastener 44 passes.

In order to preload the grommets 52 and 54 to a known compression value prior to tensioning the band, the nut 46 is threaded onto threaded fastener 44 until the two clamps contact spacer 56. Nut 46 is then further tightened until the grommets 52 and 54 reach a compression value. The compression value is determined by measuring the mechanical dimension separating washers 48 and 50. Nut 46 is tightened until the washer separation is at a preselected value.

In order to bring the grommets 52 and 54 to their final compression value, the band 12 is tensioned to 150 pounds force. The force generated by the band tension further compresses grommets 52 and 54 once again separating the keel clamp 30 from the band clamp 32, leaving spacer 56 loose and free to rotate on threaded fastener 44. It is this separation that provides the maximum isolation of the two clamps. In the tensioned state, mechanical energy must pass from the band clamp 32 through the compressed grommet 52 into threaded fastener 44 through grommet 54 to keel clamp 30 thereby providing a high degree of isolation in the clamp apparatus.

The grommet material is a thermoplastic compound selected specifically for its high degree of internal damping. The compound dissipates vibration energy as low grade thermal energy within the grommet. Such compounds, (the EAR ISODAMP G1000 Series for example) exhibit compression properties similar to viscous dampeners that when compressed quickly, appear stiff, and when compressed slowly appear soft. The grommet material has low outgassing and low rebound characteristics with high axial stiffness. In addition, the compound has a good resistance to compression set over long term use.

Although only one vibration damping clamp or vibration isolater has been depicted in the Figures, it should be understood that two such assemblies can be employed to attach the belt or band 12 to the driven element 18. Furthermore, the vibration damping clamp is not limited to "belt" driven systems, but can be used in cable driven systems in which the cable is operated under tension and in either system, the movement can be unidirectional or bidirectional.

Having described in detail a preferred embodiment of the invention, it will now be apparent to those skilled in the art, that numerous modifications can be made therein without departing from the scope of the invention as defined in the following claims:

What I claim is:

1. A vibration damping clamping apparatus for use in mechanically connecting a tensioned driving element to a driven element, said clamping apparatus comprising:
   a. means for mechanical connection to said driven element;
   b. means for mechanical connection to said driving element; and
   c. compressed vibration damping means mechanically connected to said means for mechanical connection to said driven element and to said means for mechanical connection to said driving element.

2. The clamping apparatus of claim 1 wherein said compressed vibration damping means is further compressed by the tension of said tensioned driving element when the clamping apparatus is mechanically connected to the driven element and to the tensioned driving element.

3. The clamping apparatus of claim 1 wherein said compressed vibration damping means is pre-compressed before mechanical connection of the clamping apparatus to the driven element and the tensioned driving element.

4. The clamping apparatus of claim 3 wherein said compressed vibration damping means is further compressed by the tension of said tensioned driving element when the clamping apparatus is mechanically connected to the driven element and to the tensioned driving element.

5. The clamping apparatus of claim 1 wherein said compressed vibration damping means includes first and second compressed members mechanically connected by a single mechanical connection.

6. The clamping apparatus of claim 5 wherein said first and second compressed members comprise first and second compressed grommets each having an axial bore and wherein said single mechanical connection comprises a nut and a headed bolt with the bolt extending through the axial bore of both grommets.

7. The clamping apparatus of claim 6 further comprising first and second washers positioned, respectively, between the nut and said first compressed grommet and between the bolt head and said second compressed grommet.

8. A method for damping vibrations of a tensioned, driving element mechanically connected to a driven element through a compressible vibration isolator, said method comprising the steps of:
   1. compressing said compressible, vibration isolator before tensioning said tensioned driving element; and, 2. further compressing said compressible vibration isolator while tensioning said tensioned driving element.

9. The method of claim 8 wherein said further compression of said compressible, vibration isolator is produced by the tensioning of said tensioned driving element.

10. A method for damping vibrations of a tensioned, flat metal belt in a friction driven, closed-loop servo system having a transport carriage mechanically connected to a portion of the tensioned flat metal belt through a compressible vibration isolator, said method comprising the steps of:

1. compressing said compressible, vibration isolator before tensioning said tensioned, flat metal belt; and, 2. further compressing said compressible vibration isolator while tensioning said tensioned flat metal belt.

11. The method of claim 10 wherein said further compression of said compressible, vibration isolator is produced by the tensioning of said tensioned, flat metal belt.

12. A vibration damping clamping apparatus comprising:

a. a tensioned driving element mechanically connected to a driven element through a compressible vibration isolator;

b. means for compressing said compressible vibration isolator before tensioning said tensioned driving element, said means for compressing said compressible vibration isolator being mechanically connected to said compressible vibration isolator; and c. means for further compressing said compressible vibration isolator while tensioning said tensioned driving element, said means for further compression of said compressible vibration isolator being mechanically connected to said tensioned driving element and to said driven element.

* * * * *